INVENTOR
Milton Stoll
BY
ATTORNEYS

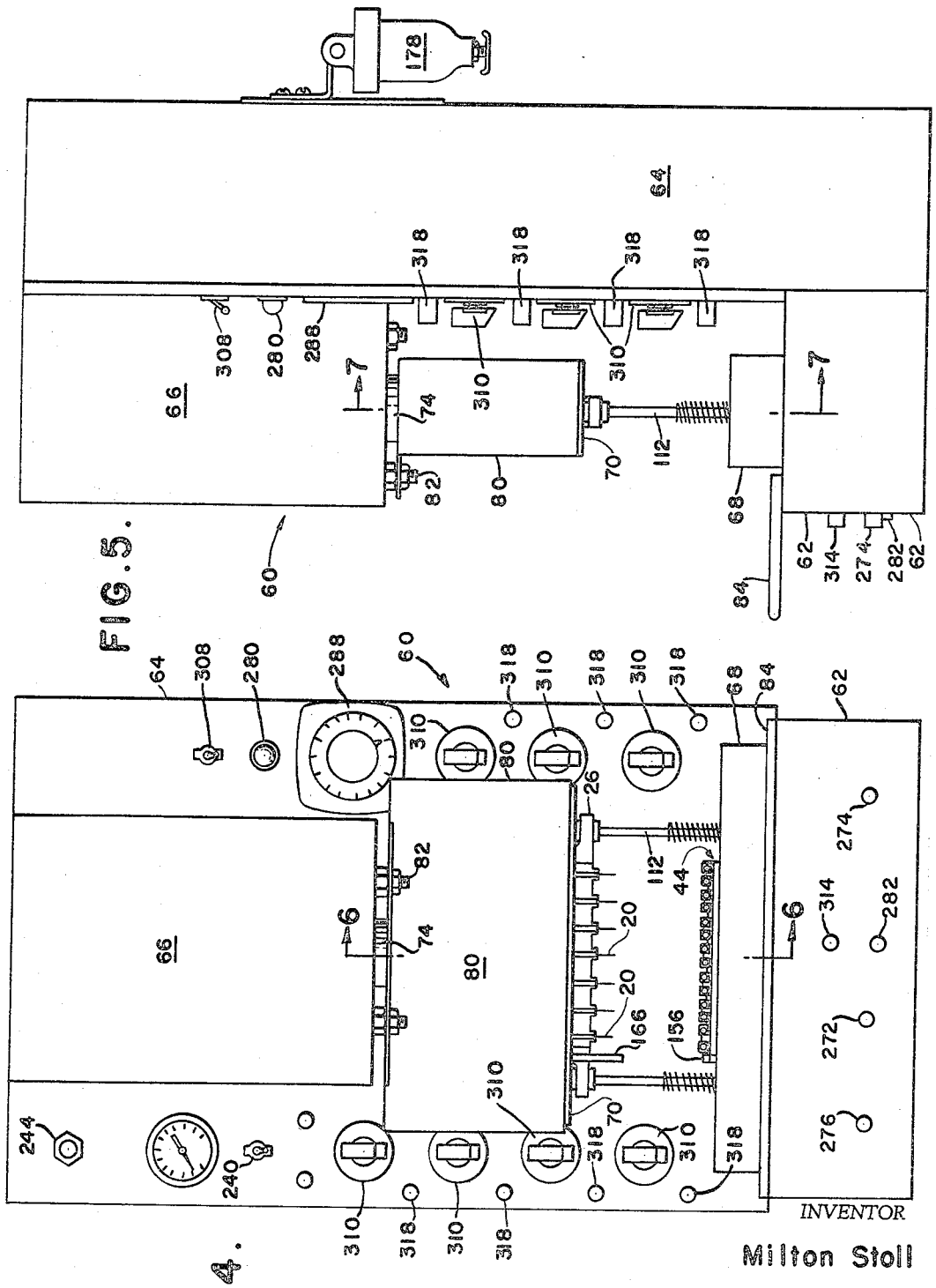

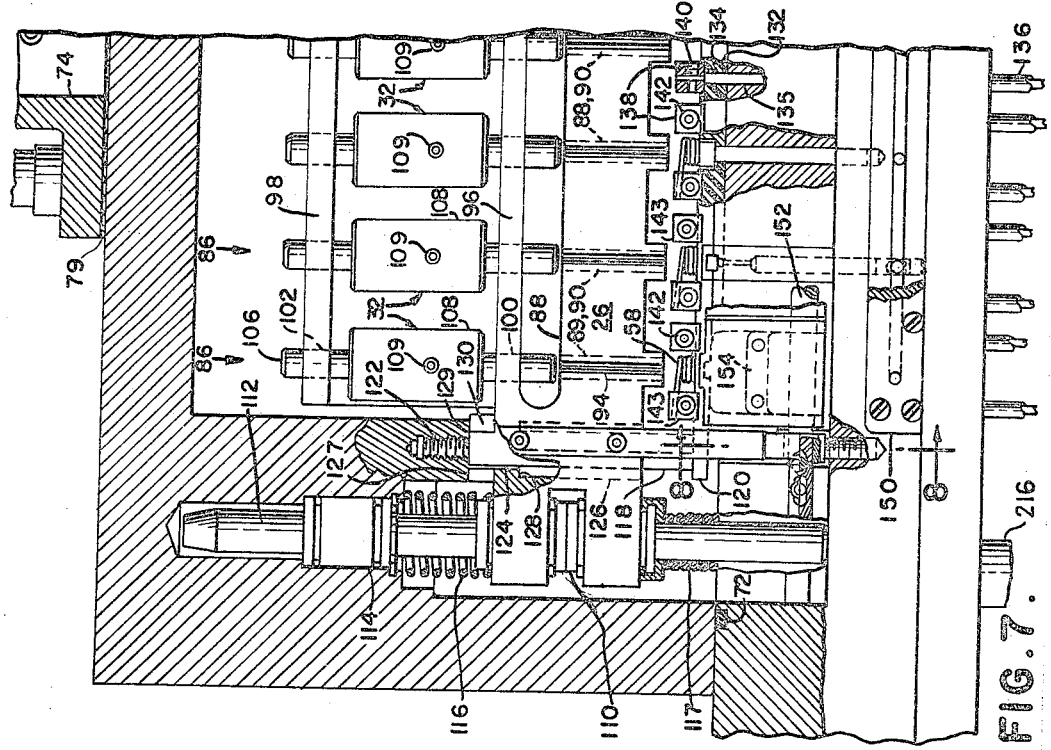
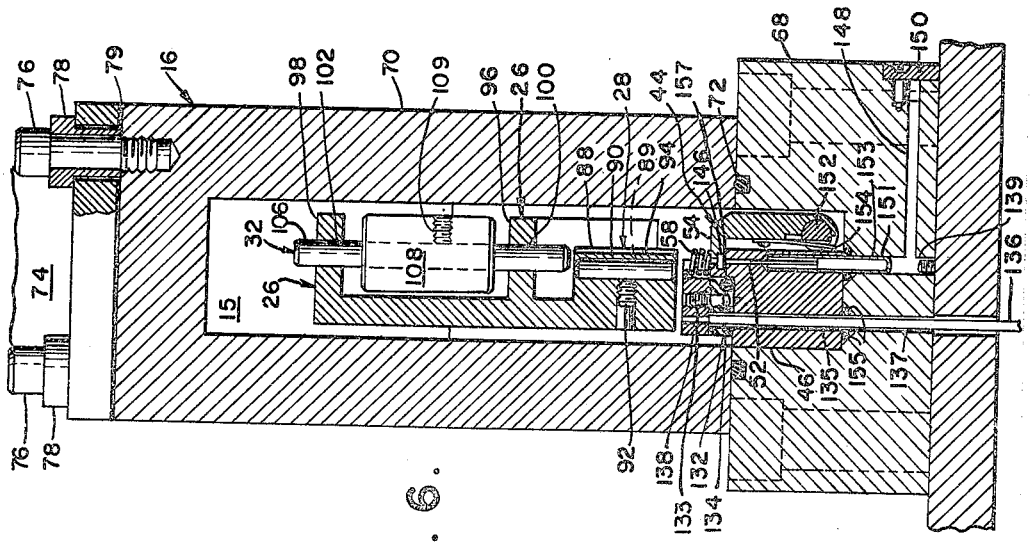

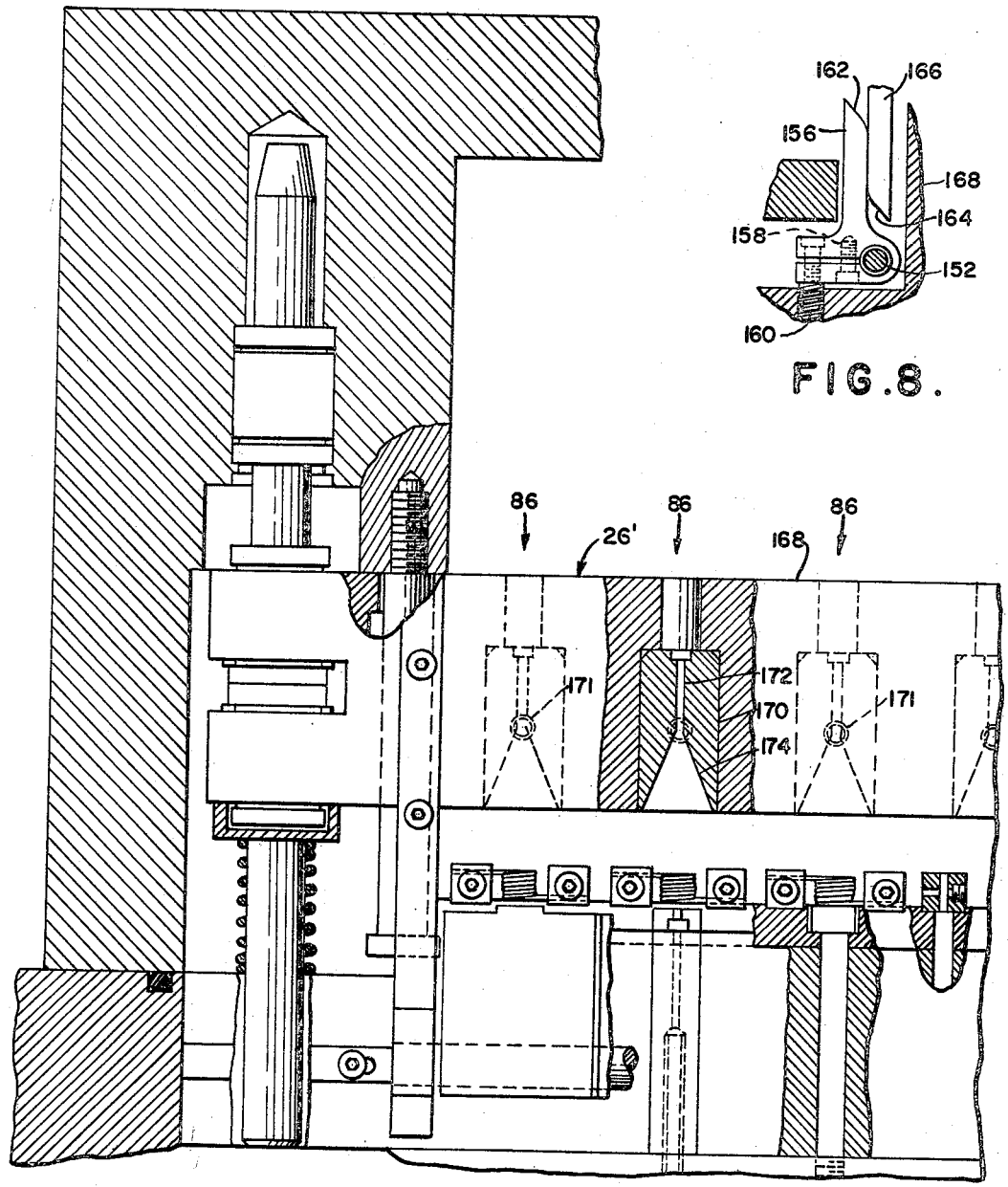

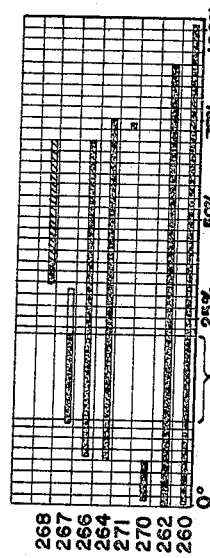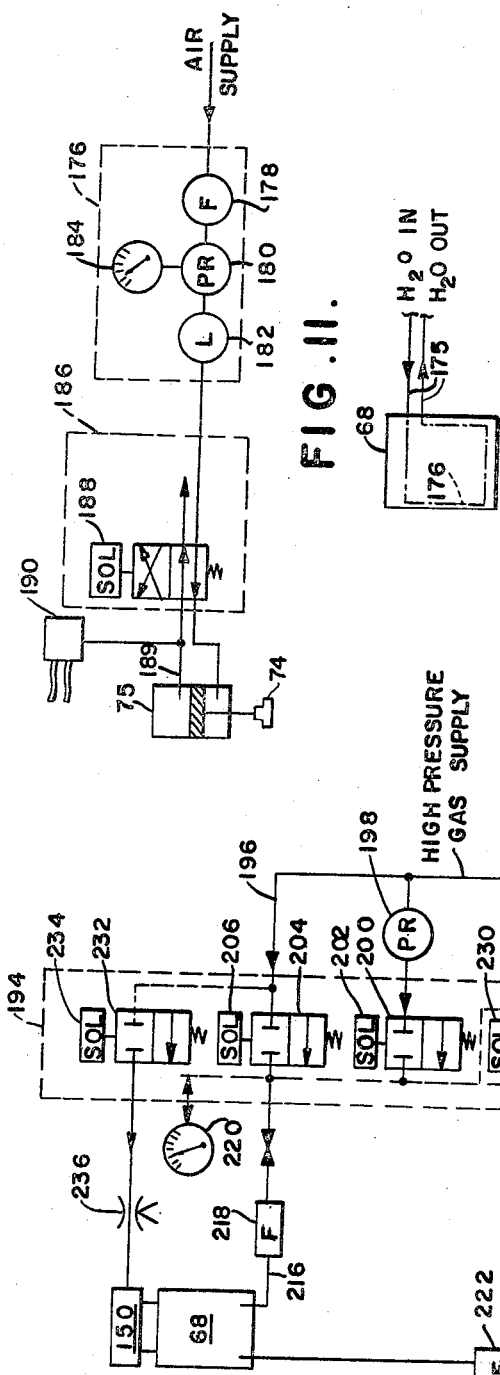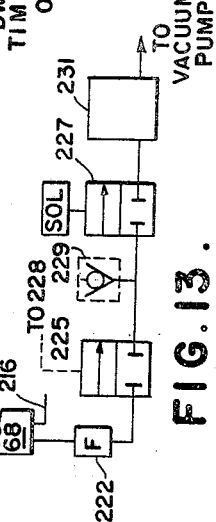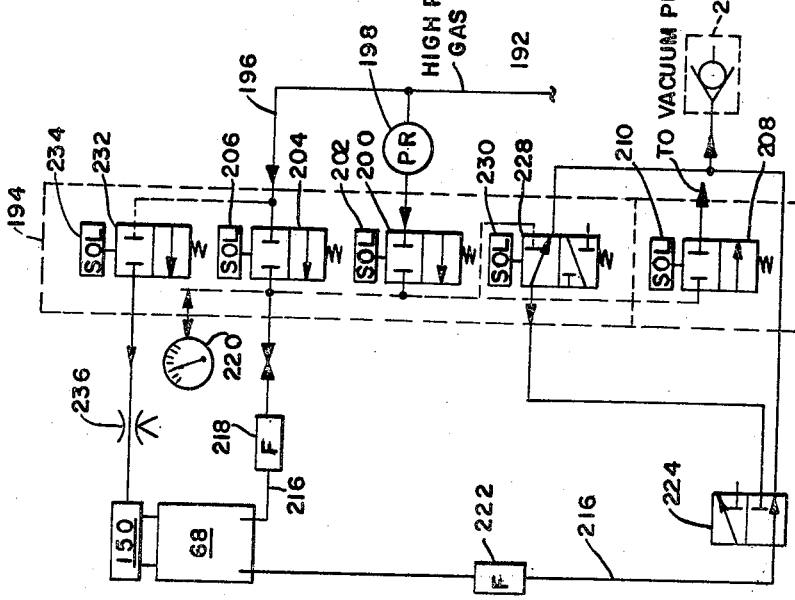

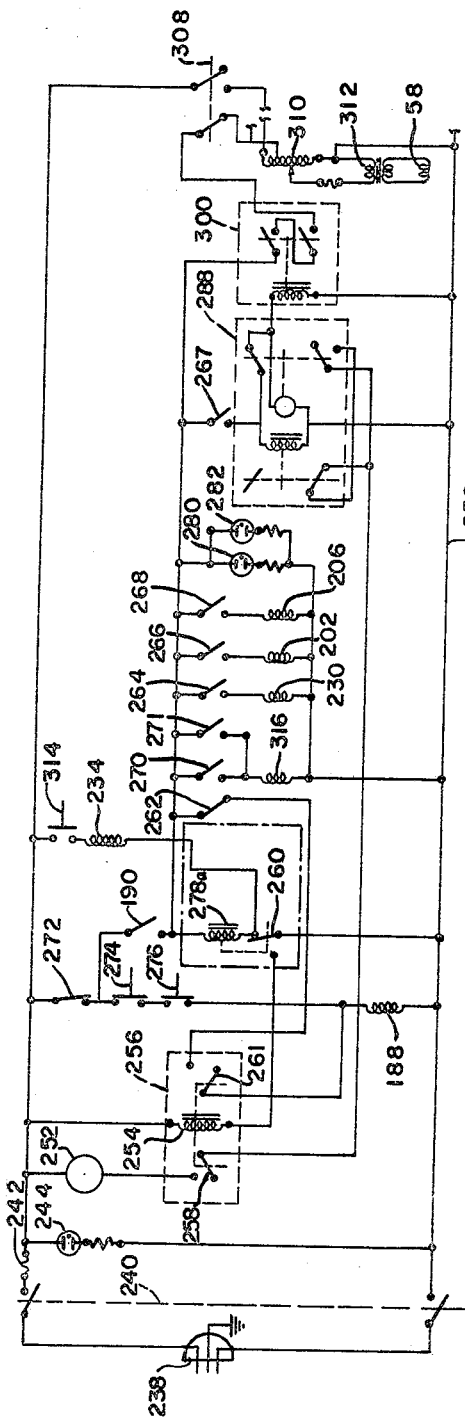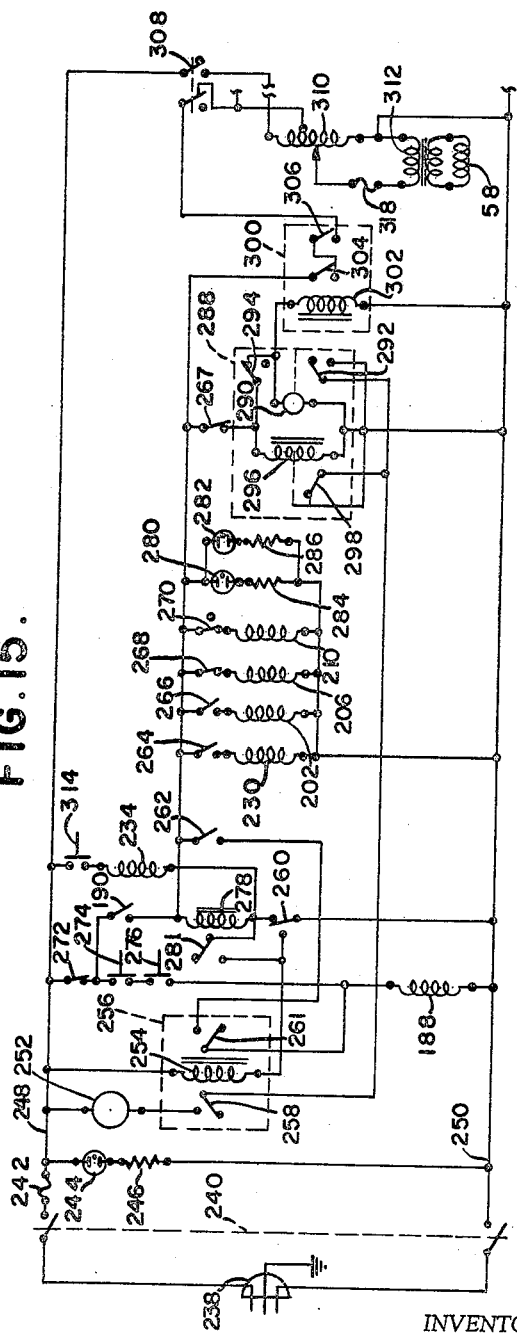

United States Patent Office 3,490,886
Patented Jan. 20, 1970

3,490,886
METHOD AND APPARATUS FOR PRODUCING GLASS TO METAL SEALS USING TWO SEALING GAS PRESSURES
Milton Stoll, New York, N.Y.,
(14—19 212th St., Bayside, N.Y. 11368)
Filed June 16, 1966, Ser. No. 558,142
Int. Cl. C03c 27/06
U.S. Cl. 65—32
25 Claims

ABSTRACT OF THE DISCLOSURE

Methods and apparatus for assembling and sealing glass enclosed devices, such as semi-conductive diodes which comprise tubular glass casing members, heaters for heating the upper end portion of the casing to a temperature sufficient to enable surface tension to collapse the casing end inwardly to form an initial ring seal, valve means for evacuating the chamber and for increasing the chamber gas pressure against the initial ring seal to complete the sealing process.

STATEMENT OF THE INVENTION

This invention relates generally to methods, apparatus and systems for producing enclosed devices, and more particularly to methods, apparatus and systems for encapsulating structures within casings, and is particularly useful for producing hermetically sealed, glass enclosed electrical devices.

STATEMENT OF THE PROBLEM

In the manufacture of enclosed electrical devices, such as glass enclosed semi-conductor devices, it has been previously suggested to produce the enclosure or casing from a tubular glass casing body member and an annular glass end cap or bead secured on the lead wire of the semi-conductor structure to be enclosed. The bead is usually pre-assembled on the lead wire and the structure is then positioned generally centrally within the tubular casing body member with the bead being positioned adjacent an end portion of the casing body member. Sealing of the bead to casing juncture has been previously carried out by the application of heat to such juncture sufficient to heat the glass to a temperature great enough to soften the glass enough that the surface tension of the glass tubing or casing will cause it to collapse inwardly against the bead and to coalesce with the bead to form a unitary structure. In producing very small devices, the bead may be eliminated and the same surface tension and high temperature heating of the casing is conventionally utilized to cause collapse of the casing directly into sealing engagement with the lead wires.

When it is desired that a nitrogen or other inert gas atmosphere be sealed within the casing, whether at the normal environmental pressure or at an elevated pressure, a similar sealing process is conventionally utilized. However, several additional problems are encountered when any gas, whether an inert or a conventional atmosphere is sealed within a glass casing by the above heating process.

The process takes longer than is the case where the device is sealed at atmospheric pressure or in a vacuum and more heat must be applied to the device because of the heat conduction of the gas, convection of the gas and the specific heat thereof which transfers heat away from the sealing area, the heat loss problems becoming more severe with increasing pressures.

A further difficulty encountered when utilizing the above high temperature heat sealing process, and a difficulty which is compounded when a pressurized gas is to be sealed within the casing results from expansion of the gas within the casing and between the bead and casing due to the heating thereof. Firstly, bubbles may form in the bead to casing junction, due to venting paths formed therebetween by the expanding gas being sealed off during the collapsing of the casing due to surface tension and when the seal is effected, expansion of the gas within the casing often causes a bulging outwardly of the casing due to the increased internal pressure resulting in a weakened casing or an actual bursting thereof. Furthermore, the degree of heating required in the heretofore known methods, process and apparatus necessary to heat the joint area sufficiently to cause a collapse of the casing and proper fusion of the casing is very high resulting in long cycling times, high cost, and excessive heating of the heater and the elements. An additional problem encountered during such high temperature heating, or for that matter, during any heating, is outgassing or the release of gasses from the element or the casing which results in contamination of the device and further increases in the internal pressure and further bulging of the softened casing.

OBJECTS OF THE INVENTION

Having in mind the foregoing problems, and others that will be readily apparent to those skilled in the art, it will be understood that a primary object of the present invention is to provide a process for encapsulating elements within structures that is rapid, efficient, and inexpensive to perform.

Another primary object of this invention, in addition to the foregoing objects, is to provide a process for sealing or encapsulating elements within a glass shell or casing wherein the glass is heated to a temperature sufficient to soften the glass and initiate a contraction of the casing against the element, forming an initial seal, followed by applying a higher pressure gas to the outside of the casing or shell while the glass is softened to further seal the glass against the element.

Yet another primary object of the present invention, in addition to each of the foregoing objects, is to provide apparatus and systems for encapsulating or sealing an element within a casing by means of heat and pressure.

A further primary object of this invention, in addition to each of the foregoing objects, is to provide methods, apparatus, and systems for encapsulating an element within a casing while in a nitrogen or other inert gas environment.

A still further primary object of the present invention, in addition to each of the foregoing objects, is to provide methods, apparatus, processes and systems for reducing or substantially eliminating outgassing during the sealing of a glass casing to an element.

Another and yet still further primary object of the present invention, in addition to each of the foregoing objects, is to provide apparatus for encapsulating elements within glass casings comprising readily replaceable chucking assemblies to enable diverse types of elements to be encapsulated with the apparatus.

Still another primary object of the present invention, in addition to each of the foregoing objects, is to provide apparatus for assembling elements within glass casings and hermetically sealing such elements within such casings.

Yet another primary object of the present invention, in addition to each of the foregoing objects, is to provide novel chucking means within an apparatus of the character described.

A still further primary object of the present invention, in addition to each of the foregoing objects, is to provide heating means structurally associated with encapsulating apparatus of the class described for enabling the performance of additional processes, such as soldering, or the like, during encapsulation.

In addition to each of the foregoing objects, it is a primary object of the present invention to provide novel methods, apparatus and systems for programming the environmental pressures during the encapsulation of elements within glass casings.

It is also a primary object of the present invention, in addition to the foregoing objects, to provide novel methods and apparatus for quickly reducing the environmental pressure during encapsulation of the class described to less than atmospheric pressure.

It is a further primary object of the present invention, in addition to the foregoing objects, to provide novel methods, apparatus, and systems for flushing elements and casings prior to the sealing of such elements within such casings.

It is another primary object of the present invention, in addition to the foregoing objects, to provide methods and apparatus for closing the venting paths normally formed between the elements and the casings during encapsulation.

Other objects and important features of the present invention will be apparent from a study of the specification following taken with the drawings, which together show, illustrate, describe and disclose at least one preferred embodiment or modification of the invention, and what is now considered to be the best mode of practicing the principles thereof.

DESCRIPTION

In the drawings:

FIG. 4 is a front elevational view of the apparatus of the present invention;

FIG. 5 is a side elevational view of the apparatus of FIG. 4;

FIG. 6 is an enlarged partial side elevational view taken along line 6—6 of FIG. 4;

FIG. 7 is an enlarged partial front elevational sectional view taken along line 7—7 of FIG. 5;

FIG. 8 is an enlarged partial sectional view taken along line 8—8 of FIG. 7;

FIG. 9 is a partial sectional view similar to FIG. 7 showing a modification of the apparatus;

FIG. 10 is a schematic representation showing the cooling water flow path;

FIG. 11 is a schematic representation of the air system of the apparatus of this invention;

FIG. 12 is a schematic representation of the nitrogen or other inert gas system of the apparatus of this invention;

FIG. 13 is a partial schematic representation of a modification of the system of FIG. 12;

FIG. 14 is a schematic diagram of one embodiment of the electrical system of the apparatus of this invention;

FIG. 15 is a schematic diagram of a modification of the electrical system of the apparatus of this invention; and FIG. 16 is a schematic diagram of a timing chart for the system of FIG. 15.

Figure 1:
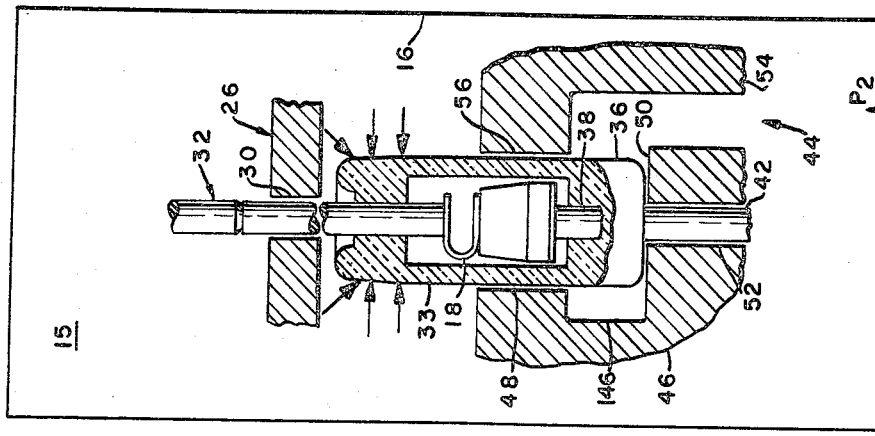
FIG. 1 is an enlarged showing of the initial configuration of the casing and element.

With reference now to the drawings, and particularly to FIG. 1 thereof, there is shown and illustrated therein a device 10 comprising an upper assembly 12 and a lower assembly 14 contained within a sealing chamber 15 defined by a structure 16. The upper assembly 12 comprises a contact 18, an upper lead wire 20 structurally and electrically associated therewith, and an annular glass bead 22 having an aperture 24 extending substantially axially therethrough threaded on and structurally associated with the upper lead wire 20, preferably in spaced relationship to the contact 18, the upper assembly 12 being temporarily structurally associated with a movable upper chucking assembly 26, preferably comprising a magnetic chuck bar 28 having alignment means 30 extending transversely thereof and clamping weights 32 slidably associated therewith in axial alignment with the alignment means 30, the upper lead wire 20 being positioned by the alignment means 30 of a magnetic chuck bar 28 with the magnetic chuck bar 28 being effective to retain the upper assembly 12 in a desired orientation.

The lower assembly 14 of the device 10 comprises a tubular glass casing member 33 having a substantially open upper end portion 34 and an annular lower end portion 36 provided with an aperture 38 extending axially therethrough, a device body such as a semi-conductor body 40 contained within the tubular casing member 33 and a lower lead wire 42 structurally and electrically associated with the body 40 threaded through the aperture 38 of the annular end portion 36 of the tubular casing member 33. The upper wire 30, contact 18, body 40 and lower lead wire 42 accordingly define an element to be encapsulated within a casing defined by the casing member 33 and the glass bead 22. While the drawing and description assume that the lower lead wire 42 be structurally connected with and sealed to the annular end portion 36, it is within the scope of this invention to seal the lower lead wire 38 to the casing member 33 with the apparatus and method of this novel invention and to seal an element within a tubular casing without utilizing the glass bead 22.

The lower assembly 14 is clamped in position by a lower clamping assembly 44 comprising a fixed jaw 46 provided with a gripping portion 48 constructed and arranged to grip the tubular casing member 33 and a support surface or portion 50 for the annular end portion 36 of the tubular casing member 33, the fixed jaw 46 being provided with a transversely extending aperture 52 to enable passage therethrough of the lower lead wire 42. A movable jaw 54, having a casing gripping portion 56, is adapted by actuating mechanisms hereinafter described to move into gripping heat transfer engagement with the tubular casing member 33 to clamp the tubular casing member 33 against and positioned on the fixed jaw 46 of the lower clamping assembly 44. The clamping weight 32 is adapted to urge the upper assembly 12 toward the lower assembly 14 during sealing therebetween and the fixed jaw 46 and the movable jaw 54 are preferably of a material, such as metal, having high thermal conductivity to enable the lower clamping assembly 44 to be effective as a heat sink during subsequent heat sealing of the device 10 and thereby preclude excessive heating thereof in other than the joint area thereof when clampingly engaged with the tubular casing 33 of the device 10. The lower assembly 14, and especially the fixed jaw 46 thereof, as will be more fully set forth below, may be further provided with heating means to enable heating of the element during encapsulation, if desired, to enable auxiliary manufacturing operations, such as soldering, or the like, to be performed concurrently with the sealing. Furthermore, the upper chucking assembly 26 and the lower clamping assembly 44 are preferably structurally removably associated with the structure 16 to enable ready replacement thereof for sealing assemblies 12 and 14 of differing sizes and characteristics.

Figure 2:
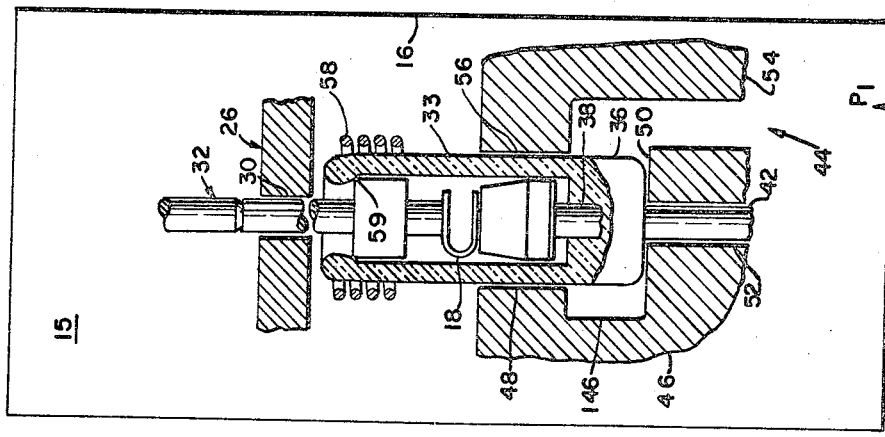
FIG. 2 is an enlarged showing of the element assembled with the casing and heated and softened to effect a partial collapse of the casing to form an initial seal.

Referring now more particularly to FIG. 2 of the drawing, wherein the movable jaw 54 has been moved into a position wherein the clamping portions 56 and 48 of the movable jaws 54 and 46, respectively, are in firm clamping engagement with the tubular casing member 33 of the lower assembly 14 to firmly positively position and retain the lower assembly 14 with the lower clamping assembly 44 and the upper chucking assembly 26 has been moved toward the lower clamping assembly 44 assembling the upper assembly 12 of the device 10 with the lower assembly 14 of the device 10 wherein the contact 18 is in electrical contact with the body 40 and clamped thereagainst by the clamping weight 32 acting through the upper bead wire 20, and the glass bead 22 is concentrically assembled within the open end portion 34 of the tubular casing member 33, a softening heat is applied to the open end portion 34 of the casing member 33 and the juxtaposed glass bead 22 by heating means such as an electric heater element 58 to soften the end portion 34 of the glass casing member 33 until the surface tension thereof causes a collapse of the open end portion 34 of the tubular casing member 34 into initial sealing contact with the glass bead 22; the lower clamping assembly 44 acting as a heat sink to preclude excessive heating of the body 40 of the device 10 during such heating. It is not necessary, with this novel invention, to heat the glass of the casing member 33 and the bead 22 to a temperature sufficient to fuse the glass of the bead 22 and the tubular casing member 33 by the temperature alone, but to only heat the glass to a temperature at which the glass casing member 33 will collapse into contact with the bead 22 to form an initial or ring seal 59 therebetween.

Figure 3:
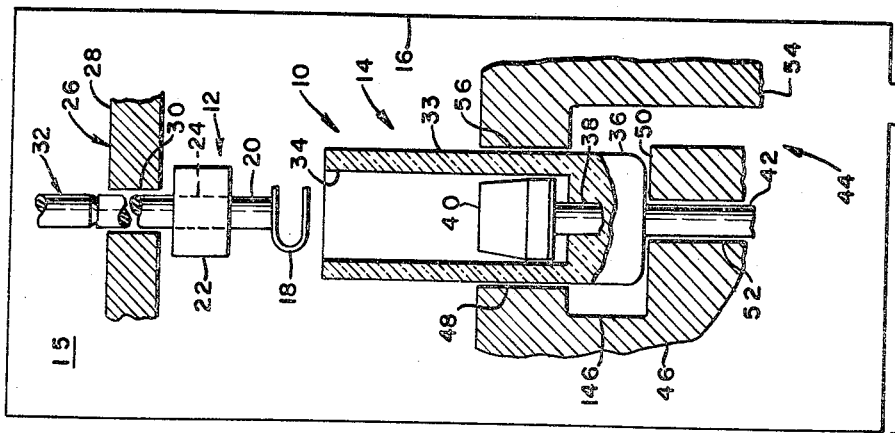
FIG. 3 is an enlarged showing of the manner in which pressure is utilized to further seal the softened assembly of FIG. 2.

Referring now more particularly to FIG. 3 of the drawing, when the tubular casing member 33 has been heated to a temperature sufficient to soften the glass and collapse the casing member 33 into contact with the bead 22, a pressurized gas, comprising, for example, conventional atmospheric gas, nitrogen, or other inert gasses, is admitted to the chamber 15 to apply a pressure to the exterior of the casing member 33, and, by the combined heat and pressure, cause a fusion of the glass bead 22 and the tubular casing member 33 without the necessity of over-heating the glass thereof above the hereinbefore mentioned softening temperature and without requiring that the glass be heated to a temperature at which the glass of the bead 22 and the casing member 33 freely flow and fuse.

While the above description has assumed that the device 10 is initially assembled at atmospheric pressure and that a pressurized gas is admitted to the chamber 15 after softening of the glass by means of the heater 58, the chamber structure 16 completely encloses the chamber 15 so that the initial assembly and softening of the tubular casing member 33 may be performed in any desired gas or gas mixture, at any desired pressure, the only requirement being that the final pressure be sufficient to work the softened glass and preferably is higher than the initial pressure, or the pressure of the gas sealed within the casing member 33 so that the softened glass casing member 33 will not be bulged outwardly by internal pressure and so that gas bubbles will not form in the joint between the casing member 33 and the bead 22.

In other words, the present novel invention forms an initial or ring seal between the casing and the bead, or between the casing and the wire lead where the bead is omitted, and then a higher pressure or post pressure is applied to the exterior of the casing to further seal the casing to the bead or lead wire. The post pressure prevents bulging of the softened casing, precludes formation of gas bubbles within the seal, and balances the pressures developed during heating to reduce outgassing. The post pressure further assists in forming the final seal to enable the sealing to be effectuated at lower temperatures and with less heating of the casing and element, enabling the formation of a strong and reliable seal in less time than with previously known methods and apparatus.

Referring now to FIGS. 4 through 8 of the drawing, there is shown and illustrated a seven-station sealing machine 60 comprising a base cabinet 62, an upstanding back support cabinet 64 structurally associated with the base cabinet 62, and a head cabinet 66 structurally associated with the back cabinet 64 and in alignment with the base cabinet 62. A base structure 68 is mounted with the base cabinet 62 and supports the lower clamping assemblies 44. A bell jar 70 is reciprocated into and out of contact with the base 68 and sealing means such as an O-ring gasket 72 is provided to seal the bell jar 70 with the base 68 when in contact therewith to define the sealing chamber structure 16. The bell jar 70 is reciprocated between an open loading position and a closed sealing position by means such as a piston cylinder arrangement 75 within the head cabinet 66, one of the cylinders and piston of which movably carries an adapter collar 74 which is connected with the bell jar 70 by fastening means such as cap screws 76 threaded through bushings 78 into the bell jar 70. A flexible shear plate 79, fabricated of rubber, or the like, is positioned between the adapter collar 74 and the bell jar 70 to enable slight lateral movement of the bell jar 70 as will be more fully described hereinafter. A safety shield 80 is structurally associated, as by threaded fasteners 82, to the head cabinet 66 and a preferably transparent generally planar safety shield 84 is supported on the base cabinet portion 62 generally forwardly of the base 68. The upper chuck assembly 26 comprises an elongate element having a generally E-shaped cross-section, provided with a plurality of, such as seven, chucking sections or stations 86, the lowermost leg portion 88 of each chucking section or station 86 being provided with a generally vertically extending aperture 89 for holding a bar magnet 90 therein by means such as clamping screws 92. The front portion of the lowermost leg portion 88 is provided at each station 86 thereof with a generally V-shaped clamping groove 94 parallel to and adjacent the bar magnet 90 so that an upper lead wire 20 positioned in the groove 94 will be retained therein by the magnet 90.

The middle leg 96 and the upper leg 98 of the upper chucking assembly 26 are each provided, in alignment with each groove 94, with apertures 100 and 102, respectively, to slidably retain the weights 32 which comprise an elongate shaft 106 and a weight element 108 attached thereto between the legs 96 and 98 as by a screw 109, to bias the upper lead wires 20 magnetically retained in each of the grooves 94 towards the lower assembly 44 upon downward movement of the bell jar 70 by contact of the shafts 106 with the lead wires 20 to lift the weights 32 by such contact. Each end portion of the upper chucking assembly 26 is provided with guide bearings 110 for slidably guiding and supporting the upper chucking assembly 26 on guide posts 112 structurally associated with the lower assembly 44. The bell jar 70 is also provided with guide bushings 114 for sliding support on the guide posts 112 and upper springs 116 and lower springs 117 are provided concentrically mounted with the guide posts 112 between the bushings 110 and 114 and between the bushings 110 and the lower assembly 44, respectively, so that upon a downward movement of the bell jar 70 produced by the piston-cylinder assembly, the upper chucking assembly 26 comprising the magnet bar 28 will be enabled to move downwardly therewith but to also slide relative thereto. A chuck synchronizer bar 118 having an enlarged lower head 120 is structurally associated with the bell jar 70 as by means of a threaded fastening 122 so as to move vertically therewith, the bar 118 slidably passing through an aperture 124 in the magnet bar 28. The aperture 124 is provided with a relieved portion 126 of a size sufficient to enable the enlarged head portion 120 of the bar 118 to pass freely thereinto until engaging a shoulder 128 so that upon upward movement of the bell jar 70, the head portion 120 of bar 118 will move upwardly, the upper chucking assembly 26 remaining in the lower position thereof until the enlarged portion 120 of the bar 118 engages the shoulder 128. Further upward movement of the bell jar 70 moves the upper chucking assembly 26 upwardly. Upon downward movement of the bell jar 70, the bar 118 will freely slide through the aperture 124 until a shoulder 129 thereof engages a bushing 130 positioned on the bar 118 above the upper chucking assembly 26 and then further downward movement of the bell jar 70 will move the upper chucking assembly downward, through means of the bushing 130.

The upper surface of the fixed jaw 46 of the lower assembly 44 is provided with an insulating terminal block 132 having apertures 134 aligned with apertures 135 extending generally vertically through the fixed jaw 46 and with apertures 137 extending generally vertically through the base 68. Insulated electric wires 136, one on each side of each station 86 are inserted through the apertures 134, 135 and 137, and the upper end portion of each wire 136 is provided with a terminal 138 structurally associated with the wires 136 by means such as set screws 140, each pair of terminals 138—138 carrying the electric heaters 58, which are clamped thereto as by set screws 142 and clamping plates 143. The elongate fixed jaw 46, which carries the terminal block 132 is also provided with the apertures 52, one for each station 86, in alignment with the clamping grooves 94 of the upper chucking assembly 26. The regions 146 of the fixed jaw 46 are relieved in th aperture area just below the gripping portion thereof so that the casing or shell 33 will be accurately gripped on the undeformed or middle portion thereof rather than engaged on the lower portion 36 thereof which may have become deformed during the formation of the lower seal. The apertures 52 extend through the fixed jaw 46 and are aligned with apertures 139 in the base 68 which connect with cross passages 148 connecting with a manifold 150 to enable an ejection fluid, such as nitrogen, to raise ejection bobs or pistons 151 slidably retained within sleeves 153 positioned within the apertures 52 and 139 to be raised upwardly to eject the completed devices 10. O-ring seals 155 are provided around the wires 136 and the sleeves 153, as shown.

The fixed jaw 46 may also be provided with a heater element 157 extending generally longitudinally thereof adjacent the apertures 52 to enable soldering or other heating operations to be performed on the devices 10 during assembly. The electric wires powering the heater element 157 may be brought outwardly of the base 68 similarly to the wires 136, and it has been found preferable, where the heater element 157 is utilized to provide separate fixed jaws for each station 86 rather than the continuous fixed jaw 46 shown to enable for expansion of the jaws during such heating to maintain accurate alignment of the stations 86.

Separate movable jaws 54 are provided for each station 86 and are pivotally mounted with an actuating shaft 152 pivotally mounted with the base 68 and extending transversely thereof and each movable jaw 54 is associated with the shaft 152 by means, such as springs 154, so that the movable jaws 54 will move upon rotation of the shaft 152 but will resiliently, due to the springs 154, hold the casings or shells 33 of the devices 10. The shaft 152 is provided with an arm 156 (see FIG. 8), which is clamped thereto by means such as a clamping screw 158, and the arm 156 is biased in a jaw opening direction, as by a spring 160. The upper end portion of the arm 156 is provided with a rounded camming surface 162 for engagement by a rounded camming surface 164 on an upper arm 166, depending from the upper assembly 26 so that upon downward movement of the upper assembly 26, the camming surface 164 will engage the camming surface 162 and cause a rotation of the shaft 152 in a clamping direction. (See FIG. 8.) Conduit means 216 provides gas communication with the chamber 15 within the bell jar 70 and conduit means 175 provides coolant flow through cooling passages 176 (see FIGS. 10 and 12) in the base 68.

The conduit means 216 communicates with the chamber 15 at each end thereof, enabling flushing gas, such as nitrogen, to enter the chamber 15 at one end thereof and exhaust at the other end thereof. In this manner, after the bell jar 70 has been lowered to seal the chamber 15, a flow of flushing gas may be admitted to the chamber 15, such flow passing entirely through the chamber 15 from one end to the other, to clean and dry the devices 10 prior to sealing. Since the flushing gas is admitted at one end of the chamber 15, and exhaust at the other end thereof, a thorough flushing of the chamber 15 and the devices 10 is obtained in a minimum of time.

Referring now to FIG. 9, there is shown and illustrated a modified upper chucking assembly 26' which may replace the magnet bar 28, magnets 88 and weights 32 if it is desired to seal pre-assembled devices 10. In this embodiment or modification, the upper chucking assembly 26' comprises a substantially rectangular bar 168 provided with wear blocks 170 at each station 86 thereof and retained therein as by screws 171, the wear blocks 170 being provided with guide apertures 172 for guiding and positioning the upper lead wires 20 of the devices 10, the lowermost portion of the apertures 172 being flared outwardly into conical recesses 174, with the apertures 172 communicating therewith at the apex thereof so that upper lead wires 20 engaging the recesses 174 be guided into the apertures 172.

The upper assembly 26 or 26', the lower assembly 44 and the guide posts 112, together with the various parts associated therewith, such as the bearings 110, the springs 116, the heaters 58, the wires 136 and the ejector bobs 151 and sleeves 153 are preferably removable from the bell jar 70 and the base 68 as a unit or sub-assembly, enabling easy interchange of such assemblies for different size and shapes of devices, as may be required for effective economical operation. The only components of such sub-assembly which pass through the chamber 16 are the wires 136 and the sleeves 153, and as hereinbefore pointed out, the O-rings 155 provide a simple seal around such components. The resilient mounting of the bell jar 70 with the adapter collar 74 reduces the criticality of the alignment of the sub-assemblies with the base 68, since slight mis-alignments are readily automatically adjusted for by the resiliency of the bell jar-to-adapter collar connection, and especially by the shear plate 79.

Referring now to FIG. 11, the air supply to the cylinder for moving the bell jar 70 is filtered and conditioned by an air supply filter-regulator-lubricator unit 176 comprising an in-line filter 178, a pressure regulator valve 180, a lubricator 182, and a pressure gauge 184, the output of the unit 176 being selectively applied to the cylinder 75 through conduits 189 having a reversing control valve 186 provided with an actuating solenoid 188. A pressure switch 190, for a purpose hereinafter described, is associated with the conduit 189 connecting the valve 186 with the upper end of the cylinder 75.

Referring now to FIG. 12, a single high pressure nitrogen or other inert gas supply conduit 192 is preferably utilized to flush and pressurize the bell jar 70 and to operate the ejectors 151. The conduit 192 is therefore connected with a manifold 194 directly at full pressure through a conduit 196 and at a reduced pressure through a pressure regulator valve 198. Low pressure gas is supplied to the bell jar 70 by a valve 200 operated by a solenoid 202 for flushing of the bell jar 70 and initial pressurizing of the devices 10. High pressure gas for postpressurizing the heated initially ring sealed devices 10 is applied to the bell jar 70 by means of a valve 204 having an operating solenoid 206. A valve 208 connected with a vacuum pump and having an operating solenoid 210 may be provided for drawing a vacuum in the bell jar 70 if desired.

The outlets of valves 200, 204 and 208 are connected to the inlet conduit 216 to the bell jar 70, the inlet conduit 216 being provided with a filter 218 and a pressure gauge 220.

The exhaust conduit 216 from the bell jar 70 is provided with an in-line filter 222 and a two-way quick exhaust valve 224 for selectively directly connecting the exhaust conduit 212 with an in-line vacuum check valve 226 or with a three-way valve 228 having a solenoid 230, the valve 228 in the unactuated position connecting the quick exhaust valve 224 to the vacuum check valve 226. In the actuated position, the valve 228 closes the connection of the quick exhaust valve 224 with the vacuum check valve 226 and connects the low pressure nitrogen with the quick exhaust valve 224.

An ejector valve 232 having a solenoid 234 connects the high pressure supply conduit 196 with the ejector manifold 150 through a needle or variable orifice valve 236.

A partial modification of the gas supply system of the preceding figure is illustrated schematically in FIG. 13. In the modification illustrated in FIG. 13, the two-way quick exhaust valve 224 and the in-line check valve 226 are replaced by a high pressure, quick dump type valve 225, a large orifice valve 227, and an exhaust check valve 229 connected with the connection therebetween, to achieve large orifice capacity on the vacuum system and eliminating the necessity of dumping any pressurized gas in the chamber 15 through the vacuum system. Conventional valving between the chamber 15 and the vacuum pump (not shown) would be inappropriate for several reasons. Firstly, if simple open-close type valves were utilized, then the valves should preferably be of either a large orifice type to enable quick evacuation of a high pressure type to enable the containment of high pressure gas within the chamber 15. A high pressure type valve is normally provided with a small orifice, to reduce the forces required to actuate the valve against the high pressure gas and a large orifice valve is normally incapable of operating against high pressure gasses because of the large force developed at a large orifice. Furthermore, it is desirable to quickly dump the chamber to atmospheric pressure prior to operatively connecting the chamber to the vacuum system so that the vacuum system is not required to remove the high pressure gas from the chamber but will always operate only from atmospheric pressure.

The high pressure quick dump type valve 225 is preferably pilot actuated from the valve 228, enabling the gas pressure from valve 228 to balance the internal pressure of the chamber and thereby open the valve 225 quickly. When the valve 225 is opened with internal pressure being present in the chamber 15, the pressurized gas is quickly dumped through the check valve 229. Also, during flushing of the chamber 15, the check valve 229 will automatically open allowing a free flow of flushing gas through the chamber 15. The check valve 229 therefore effectively precludes the presentation of a pressure greater than atmospheric to the large orifice valve 227. In practice, of course, a slight increase in pressure over atmospheric will be presented due to the operating pressure differential required by the check valve 229.

The vacuum pump capacity required may be further reduced by utilizing a relatively large chamber or accumulator 231 between the vacuum pump and the valve 227, as further illustrated in FIG. 13.

While the exhausts of both the gas system and the air system are only schematically indicated in the drawing, it has been found preferable to exhaust both of these systems away from the apparatus through suitable conduits to preclude contamination of the devices 10 and to protect the operator. Since the air system, which supplies lubricated air to the piston-cylinder 75, is exhausted away from the apparatus and inner gas is utilized for the ejectors and for all other operational functions of the apparatus, contamination of the devices 10 may be effectively precluded.

Referring now to FIG. 14, a preferred embodiment of an electric operating circuit is shown. A connector plug 238 is provided for connection with a conventional grounded source of electric power, together with a main power switch 240 and a fuse 242. An indicator lamp 244 and series resistor 246 are provided connected to the electric wires 248 and 250 to indicate that the main power switch is on and that power is being supplied.

One one side of a cam timing motor 252 provided with a cam shaft for controlling contacts 260, 262, 264, 266, 267, 268 and 270 is connected to wire 248, as is the operating coil 254 of a relay 256 having normally open contacts 258 and 261, the other side of motor 252 being connected with contact 258. An emergency switch 272 and a pair of two-hand safety start push button switches 274 and 276 are connected in series with the air cylinder solenoid 188, across wires 248 and 250, so that all three of switches 172 and the two-hand safety switches 174 and 176 must be closed to start the closing stroke of the air cylinder 74 and the bell jar 70. When the bell jar is closed, the pressure build-up in conduit 189 closes pressure switch 190, energizing a relay coil 278 and closing a contact set 281 controlled thereby, connecting the relay coil 254 with the wire 250 through the contacts 281 and 260, thereby closing contacts 258 and starting the timing motor 252. The operation of the motor 252 closes the single cycle contacts 260 retaining the coil 254 and the motor 252 energized for a full cycle of operation, the contact 262 of the cam shaft driven by the motor 252 and the contact 261 of the relay 256 controlling the air cylinder valve 186 by solenoid 188. As long as pressure switch 190 is operated, cycle on lamps 280 and 282 having series resistors 284 and 286, respectively, will be lit.

The contacts 267 energize a timer 288 having a motor 290, motor controlled contacts 292 and 294, a solenoid coil 296 and solenoid controlled contacts 298. The contacts 294 control a relay 300 having a coil 302 and series contacts 304 and 306 for controlling each of the heaters 58 through a heater test switch 308, variable auto transformer 310 and voltage stepdown transformer 312. The ejector solenoid 234 is controlled by a push button switch 314.

FIG. 15 shows a modified embodiment of the electrical circuit of the invention, and as clearly shown is substantially the same as the circuit of FIG. 14, the primary difference being that an accumulator 316 replaces the vacuum valve 208 together with a slightly modified cam timer provided with a latching relay 278. In both circuits, separate transformers 310 and 312 are provided, as indicated for each heater 58 as is a fuse 318.

FIG. 16 shows a typical cam timing diagram for the circuit of FIG. 15.

The operation is now readily apparent and will be described assuming that it is desired to both assemble and seal the devices 10, such as diodes.

With the line switch 240 and the emergency switch 272 on, whisker lead wires 20 of the upper assemblies 12 are placed in the grooves 94 with the whisker or contact 18 extending downward. The lower assemblies, casings or shells 33 are inserted in the lower chucking assembly 44 and both start buttons 274 and 276 are actuated, initiating the automatic cycle. Upon closing the start button switches 274 and 276, the solenoid 188 of the air valve 186 operates opening the air valve 186 to supply air to the cylinder 75 to move the bell jar 70 downwardly, the downward movement of the arm 166 carried by the upper chucking assembly 26 camming the arm 156 to move the movable jaws 54 of the lower clamping assemblies 44 to clamp the casings or shells 33 in the lower clamping assemblies 44. Continued downward movement of the bell jar 70 carries the upper chuck assembly 26 downwardly, engaging the weights 32 with the lead wires 20 and assembling the devices 10. At the lower extremity of the movement of the bell jar 70, the bell jar 70 seals against the base 68 and the pressure increases in the cylinder 75 to actuate the pressure switch 190 starting the cam timer motor 252 whereby the contacts 260 enable the timing motor 252 to drive through one complete revolution or cycle, enabling the contact set 262 to retain the air valve 188 in the open position thereof, that is, in a position holding the bell jar 70 sealed with the base 68 for a set time. The cam switch contacts 266 then cause the valve 200 to open supplying low pressure gas from the regulator 198 to the bell jar 70 through the inlet conduit 216, the gas flowing through the chamber 15 and out the exhaust conduit 216 to flush the chamber 15 and the devices 10 prior to sealing. If it is desired to seal the devices 10 at an elevated internal pressure, or at a vacuum, appropriate valve control is accomplished by the various cam contacts controlling the low pressure and vacuum valves. The cam switch contacts 267 then open, disconnecting the timing motor 252 and connecting the dwell timing motor 288 which operates the heating coils 58 for a set time to soften the glass casings or shells 33 and start the sealing action by forming the above mentioned ring seal. Upon completion of the heating cycle of the dwell timer 288, the timing motor 252 again is operated and the cam switch contact 268 causes the opening of the valve 204 to admit high pressure gas into the bell jar 70 to post pressurize the chamber 15 and complete the sealing of the softened casing or shells 33. The cam switch 262, upon completion of the cycle, deactivates the solenoid 188 to release the air valve 186 and enable the bell jar 70 to rise due to the reversing action of the valve 186 to supply pressurized air to the lower end of the double acting cylinder 75. The pressure actuating the pressure switch 190 is thereby released, disconnecting all of the electrical connections except the cam switch contact 260 which causes timer motor 252 to complete the cycle readying the system for the next cycle. The completed devices 10 are ejected by operation of ejector switch 314 to actuate the ejector valve 232 and thereby admit high pressure gas to the ejector pins 151.

The heater test switch 308 bypasses the heater cycle controls to enable manual operation of the heaters 58.

What is claimed is:

1. Method of manufacturing sealed hollow devices comprising, positioning a generally tubular glass-like casing member within a chamber, flushing said chamber with a non-oxidizing gas at a first pressure, sealing said chamber to provide oxidization-free conditions therewithin, heating said generally tubular casing member only at an open end portion thereof to a temperature merely sufficient to enable surface tension to collapse said portion and beneath the temperature at which full sealing would occur unaided to form an initial ring seal and applying a post-pressurizing sealing gas to said chamber at a second pressure greater than that confined within the device by the initial ring seal and to the exterior of said portion to squeeze said portion and thereby effectuate a strong and reliable seal thereat, to balance outgassing, to preclude bulging or bursting, and to preclude the expansion of any gas trapped therein without distorting the remainder of said casing member and without excessive heating thereof.

2. Method of manufacture as defined in claim 1 further comprising, supporting and positioning element structure of said device having a lead wire and a glass-like bead disposed thereon with the lead wire extending generally axially through the open end of the casing member with the bead disposed therewithin prior to said step of heating, enabling said element structure and said casing member to be assembled and sealed to a completed device within said chamber.

3. Method of manufacturing as defined in claim 1 further comprising magnetically supporting a first sub-assembly of said device on a movable support assembly for enabling sliding movement of said sub-assembly on said support generally axially of said tubular casing member, supporting a second sub-assembly of said device including said casing member on a fixed support assembly, and translating said movable support assembly toward said fixed support assembly so that upon contact between said first and second sub-assemblies, said first sub-assembly will commence sliding along said movable support to automatically position said first sub-assembly in contact with said second sub-assembly and within said casing member and assemble said sub-assemblies together prior to sealing of said device.

4. Method of manufacturing as defined in claim 1 further comprising clamping a lower portion of said casing member in a fixed support and heating said support to separately heat said lower portion of said casing member and the adjacent internal components thereof to perform an auxiliary manufacturing heat responsive process such as soldering on said device during said sealing.

5. Method of manufacturing as defined in claim 1 wherein said flushing comprises, flushing said device with a pressurized flushing non-oxidizing gas passed generally longitudinally through said chamber and generally transversely across the open end portion of said casing member, exhausting said flushing non-oxidizing gas through a check valve and drawing a vacuum within said chamber and casing member past said check valve prior to forming said initial ring seal and sealing said casing member.

6. Method of manufacturing sealed hollow devices comprising resiliently supporting a first sub-assembly of said device on a first support assembly, so that said first sub-assembly may slide axially relative thereto, supporting a second sub-assembly of said device fixedly on a second support assembly, translating at least one of said support assemblies toward the other of said support assemblies to assemble said sub-assemblies together, enclosing said support assemblies within a chamber and applying heat and pressurized sealing non-oxidizing gas to said device within said chamber to seal said device.

7. Method of manufacturing defined in claim 6 wherein said step of resiliently supporting comprising positioning an elongated portion of said first sub-assembly in a groove of said first support assembly extending generally axially away from said second sub-assembly and magnetically securing said elongated portion within said groove.

8. Apparatus for encapsulating element structure within glass-like casing structure comprising, in combination, chamber means for containing gas under pressure, casing support means within said chamber means for retaining and positioning such casing structure, element support means disposed above said casing support means and movable relative thereto along a generally vertically disposed path for positioning said element structure within said casing structure, means for heating an upper end portion of said casing structure in a sealing area to a temperature sufficient to enable surface tension to collapse said upper end portion to form an initial ring seal, and means for supplying a sealing gas under pressure to said chamber means to seal said upper end portion of said casing structure to said element structure, said chamber means comprising base structure and bell jar structure mounted for reciprocation generally perpendicular said base structure along a generally vertically disposed path, and having a generally downwardly directed open ended cavity therein, the side wall edge portions of said bell jar structure adjacent the open end thereof being movable into sealing contact with said base structure, said casing support means being mounted with said base structure and said element holding means being movable with said bell jar structure during at least a portion of its travel, said casing support means, said element support means and said heater means together defining a single, unitary sub-assembly adapted for rapid and easy mounting with and dismounting from said base structure to enable simple interchangeability of subassemblies for enabling assembly and sealing of diverse element structure and casing structure.

9. Apparatus as defined in claim 8 wherein said casing support means, said element support means and said heating means define a sub-assembly adapted for mounting with said base to enable simple interchangeability of sub-assemblies for sealing diverse elements and casings.

10. Apparatus as defined in claim 8 further comprising additional heater means mounted with said casing support means for providing heat to said casing structure downwardly of said upper end portion thereof to enable supplemental process heating of said device.

11. Apparatus for heat sealing generally tubular glass-like casing structure comprising, in combination, chamber means for containing gas under pressure, casing support means within said chamber means for retaining and positioning said casing structure disposed within said chamber means with the longitudinal axis thereof extending in a first direction, heater means for softening at least an end portion of said casing structure in a sealing area, and means for flushing said chamber with a flushing non-oxidizing gas to clean and de-contaminate said casing structure comprising, in turn, supply conduit means for supplying said flushing non-oxidizing gas to one end portion of said chamber laterally outwardly of one side of said casing structure and exhaust conduit means for exhausting said non-oxidizing gas from an opposite end of said chamber laterally outwardly of an opposite side of said casing structure so that flushing non-oxidizing gas may flow freely completely through said chamber means generally transversely across said casing structure.

12. Apparatus for sealing glass-like casing structure comprising in combination, chamber means for containing gas under pressure, casing support means within said chamber for retaining and positioning said casing structure, heater means for softening at least a portion of said casings in a sealing area, and means to evacuate said casing structure prior to actuation of said heater means, said evacuating means comprising, in turn, a vacuum pump, a high pressure quick dump valve, a low pressure large orifice valve, a one-way check valve and conduit means connecting said high pressure valve with said vacuum pump, and said one-way check valve connected with both said low and high pressure valves intermediate thereof for automatically exhausting high pressure gas upstream of said low pressure valve to enable large orifice capacity while precluding dumping of any high pressure gas in said chamber through said vacuum pump.

13. Apparatus for assembling element structure with open ended casing structure, comprising, in combination, base structure and bell jar structure mounted for reciprocation toward and away from said base structure and having an open ended cavity therein with the end opening thereof facing said base structure, the side wall edge portions of said bell jar structure surrounding the end opening being movable into contact with said base structure to define therewith a gas-tight chamber, casing support means mounted with said base structure for retaining and positioning said casing structure within said chamber with the end opening thereof facing said bell jar structure and opening and element holding means for positioning said element structure within said casing during closure of said chamber, means for movably mounting said element holding means above said base structure and means mounted with the bell jar structure for engaging the element holding means to move the element holding means downwardly with the bell jar structure.

14. Apparatus as defined in claim 13 wherein said casing support means, said element support means and said heating means together define a single sub-assembly for rapid and easy mounting with and remounting from said base structure to enable simple and rapid interchangeability of sub-assemblies for enabling automatic assembly and sealing of diverse element structure and casing structure.

15. Apparatus as defined in claim 14 wherein said sub-assembly further comprises bell jar guide means for restraining said bell jar structure to movement perpendicular said base structure and in accurate alignment with said sub-assembly, said apparatus further comprising resilient mounting means for said bell jar structure so that said bell jar structure may shift laterally about said base structure and a slide relative to said bell jar guide structure.

16. Apparatus as defined in claim 13, wherein said casing support means comprises fixed jar means for positioning said casing structure, a shaft mounted with said base structure for rotational movement relative to said base structure about an axis disposed generally perpendicular the path of movement of said bell jar structure, camming means extending generally perpendicular outwardly of said shaft for rotation therewith about the axis of said shaft, camming arm means carried by said bell jar structure for engaging said camming means to provide rotational movement of said shaft during movement of said bell jar structure towards said base structure, and movable jar means carried by said shaft for rotation therewith to clamp said casing structure against said fixed jar means upon rotation of said shaft.

17. Apparatus as defined in claim 16, wherein said fixed jar means comprises a clamping portion adjacent an end portion thereof spaced apart from said shaft and a relieved portion and adjacent said shaft to enable said casing structure to be positioned and clamped at a generally longitudinally intermediate portion thereof.

18. Apparatus as defined in claim 13, wherein said element holding means comprises an elongate bar extending transversely and generally horizontally within said bell jar structure, said bar being provided on a surface thereof with at least one substantially vertically extending groove, magnet means mounted adjacent said groove for magnetically holding a portion of said element within said groove, and weight means slidably mounted with said bar in alignment with the apexes of said grooves for biasing said element towards said casing support means.

19. Apparatus as defined in claim 13, further comprising piston-cylinder means for moving said bell jar structure towards said base structure, means for supplying a motive fluid to said piston-cylinder means, and cycle control means for controlling said motive fluid supply means, for controlling said heater means and for controlling said gas supply means.

20. Apparatus as defined in claim 19, wherein said motive fluid supply means comprises solenoid actuated valve means operatively associated with a source of pressurized fluid, said heater means comprises a voltage modifier connected to an electric heating coil and a source of electric power, said gas supply means comprises solenoid actuated high pressure gas valve means connected to a source of pressurized gas, a pressure reducer connected to said source of pressurized gas and a solenoid actuated low pressure gas valve connected to said pressure reducer, and said cycle control means comprises a timing motor, cam controlled switch means driven by said timing motor for sequentially actuating said low pressure gas valve means, said heater means, and said high pressure gas valve means.

21. Apparatus as defined in claim 20, wherein said cycle control means further comprises, manual switch means for operating said motive fluid supply means, pressure switch means connected to said piston-cylinder means and said timing motor for starting said timing motor in response to the motive fluid pressure increase caused by sealing of said bell jar structure with said base structure.

22. Apparatus as defined in claim 20, further comprising adjustable dwell time control means for controlling the heating time of said heater means and halting the operation of said timing motor during said heating time.

23. Apparatus for encapsulating elements within glass-like casing structure comprising, in combination, chamber means for containing gas under pressure, casing support means within said chamber means for retaining and positioning said casing structure, heater means for softening at least a portion of said casing structure in a sealing area, means for supplying a non-oxidizing gas under pressure to said chamber means to seal said softened casing structure and ejecting means for separating said casing structure from said support means, said ejecting means being adapted for actuation by said non-oxidizing gas supply means to preclude contamination of said chamber and comprising, in turn, a reciprocable gas operated piston and conduit means selectively exposing the underside of said piston to said non-oxidizing gas supply.

24. Apparatus for sealing glass-like tubular casing structure comprising, in combination, chamber means for containing gas under pressure, casing support means within said chamber means for retaining and positioning said casing structure, means for heating an upper end portion of said casing structure in a sealing area and means for controlling the atmosphere within said chamber, said chamber means comprising base structure and bell jar structure mounted for reciprocation generally perpendicular said base structure along a generally vertically disposed path and having a generally downwardly directed open ended cavity therein, the side wall edge portions of said bell jar structure adjacent the open end thereof being movable into sealing contact with said base structure, wherein said casing support means comprises fixed jaw means for positioning said casing structure, shaft means mounted with said base structure for rotational movement relative to said base structure about an axis disposed generally perpendicular the path of movement of said bell jar structure, camming means associated with said shaft means for rotating said shaft means, camming arm means carried by said bell jar structure for rotating said cam means and said shaft means during movement of said bell jar structure toward said base structure, and movable jaw means mounted with said shaft means for clamping said casing structure against said fixed jaw means upon rotation of said shaft means.

25. Apparatus for encapsulating element structure within open ended glass-like tubular casing structure comprising, in combination, chamber means for containing gas under pressure, casing support means within said chamber means for retaining and positioning such casing structure generally upwardly open, element support means disposed above said casing support means and movable relative thereto along a generally vertically disposed path for positioning said element structure within said casing structure, means for heating an upper end portion of said casing structure, said chamber means comprising base structure and bell jar structure mounted for reciprocation joined perpendicular said base structure along a generally vertically disposed path and having a generally downwardly directed open end cavity therein, the side wall edge portions of said bell jar structure adjacent the open end thereof being movable into sealing contact with said base structure, said casing support means being mounted with said base structure and said element holding means being movable with said bell jar structure during at least a portion of its travel and wherein said element holding means comprises an elongated bar extending transversely and generally horizontally within said bell jar structure, said bar being provided on a surface thereof with at least one substantially vertically extending groove, magnet means mounted adjacent said groove for magnetically holding a portion of said element structure within said groove, and weight means slidably mounted with said bar in alignment with the apex of said groove for biasing said element structure toward said casing support means.

References Cited
UNITED STATES PATENTS

| | | | |
|---|---|---|---|
| 2,882,648 | 4/1959 | Hovgaard. | |
| 2,984,046 | 5/1961 | Brewer. | |
| 2,622,779 | 12/1952 | Smith et al. | 65—32 |
| 2,902,796 | 9/1959 | McDuffee | 65—154 |
| 3,271,124 | 9/1966 | Clark | 65—59 |

S. LEON BASHORE, Primary Examiner

E. R. FREEDMAN, Assistant Examiner

U.S. Cl. X.R.

65—34, 42, 59, 139, 154, 155